(No Model.) 4 Sheets—Sheet 4.

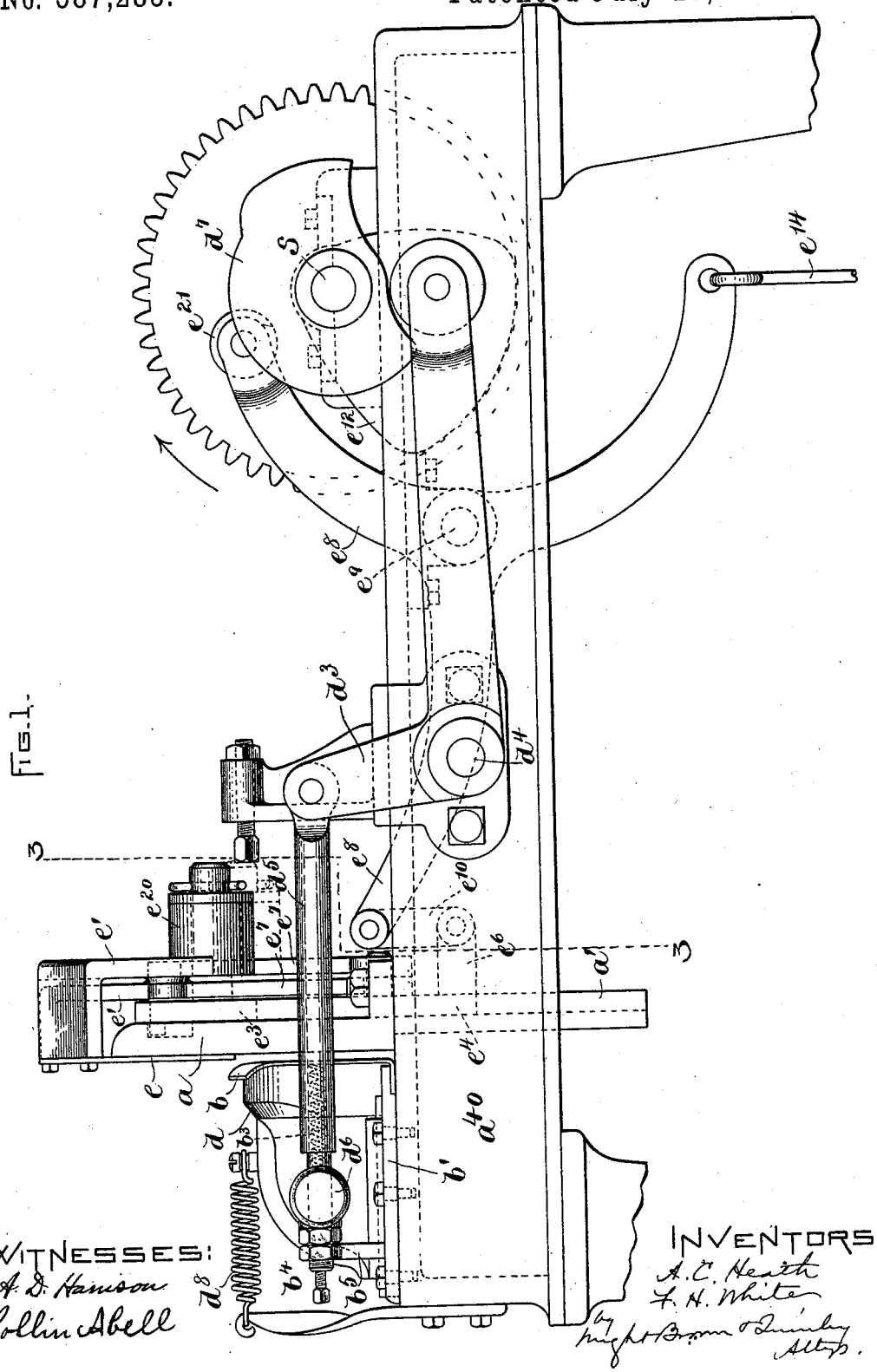

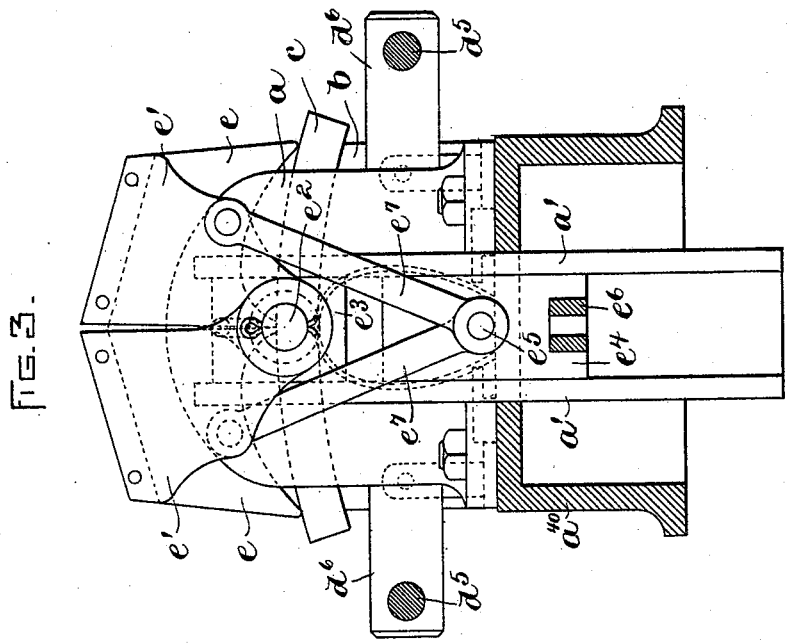
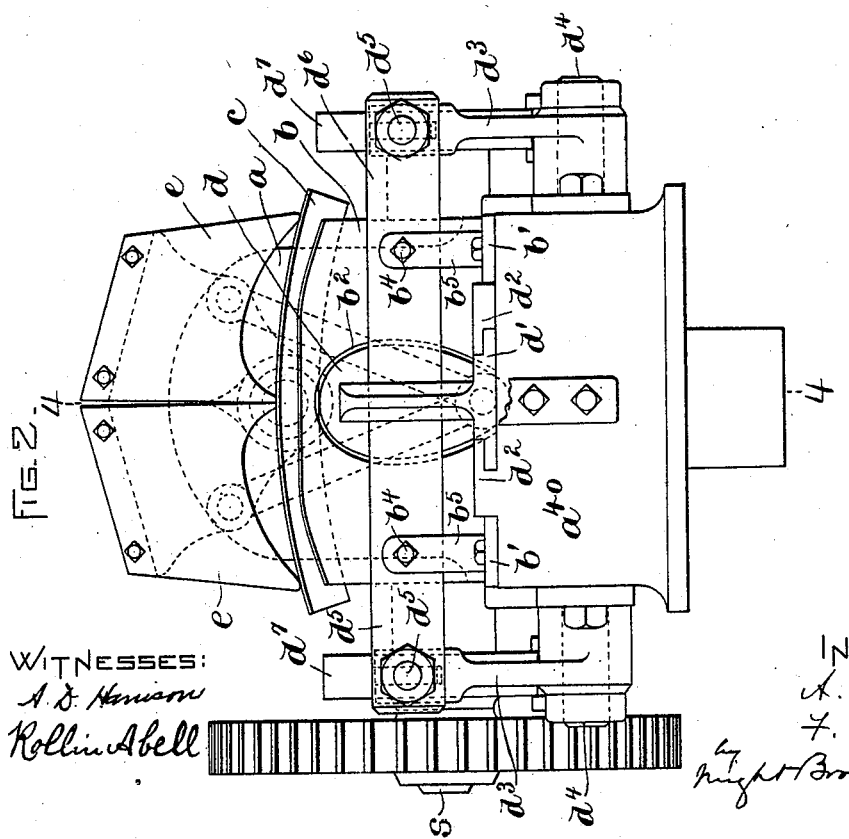

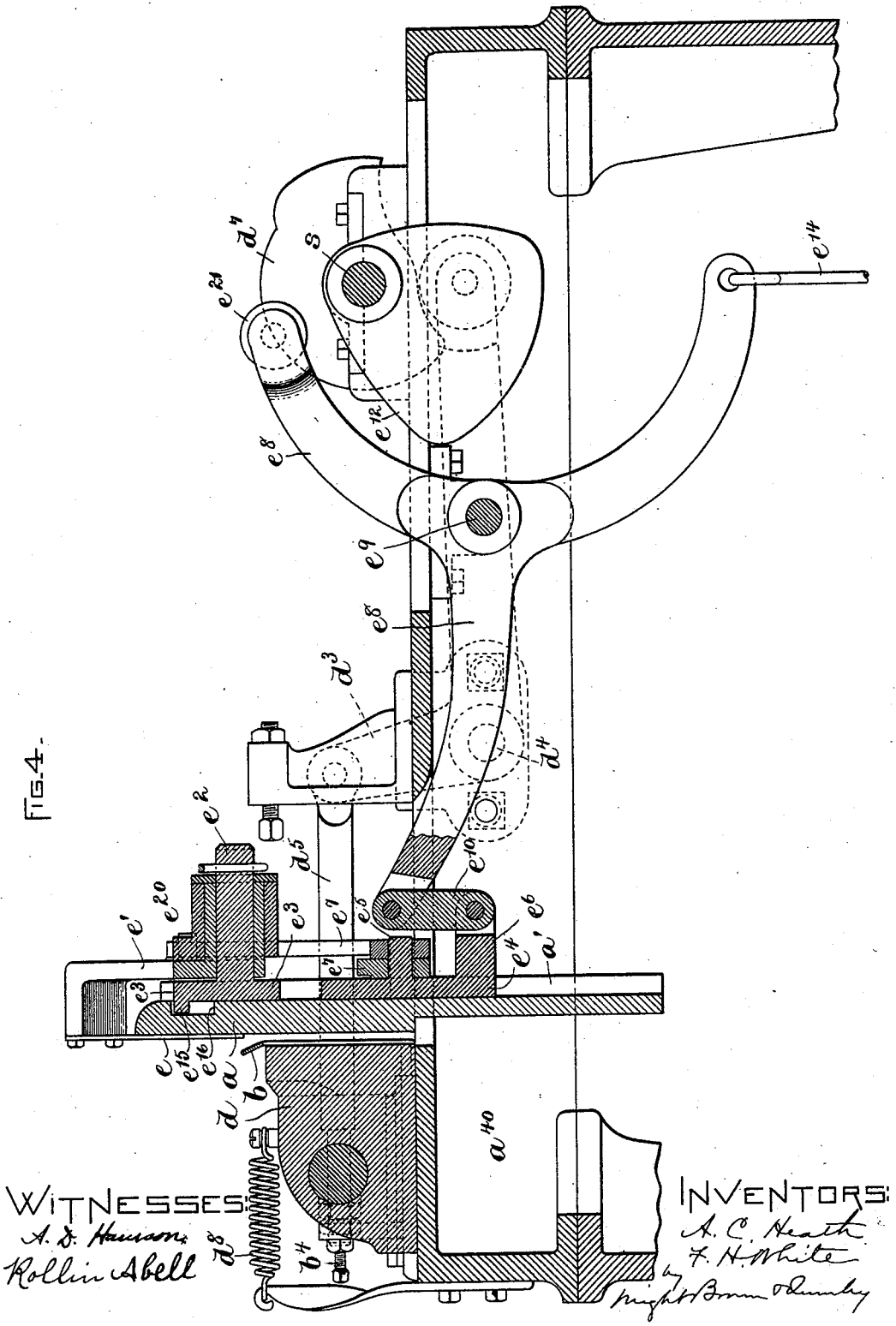

A. C. HEATH & F. H. WHITE.
MACHINE FOR MAKING HEEL RANDS.

No. 587,283. Patented July 27, 1897.

WITNESSES:
A. D. Hanson.
Rollin Abell.

INVENTORS
A. C. Heath
F. H. White

UNITED STATES PATENT OFFICE.

AMASA C. HEATH AND FRED H. WHITE, OF EASTON, MASSACHUSETTS.

MACHINE FOR MAKING HEEL-RANDS.

SPECIFICATION forming part of Letters Patent No. 587,283, dated July 27, 1897.

Application filed June 10, 1895. Renewed January 27, 1896. Serial No. 577,078. (No model.)

*To all whom it may concern:*

Be it known that we, AMASA C. HEATH and FRED H. WHITE, of Easton, in the county of Bristol and State of Massachusetts, have invented certain new and useful Improvements in Machines for Making Heel-Rands, of which the following is a specification.

This invention has for its object to provide a simple, effective, and rapidly-operating machine for bending a heel-rand strip into heel shape and pressing and compacting the bent strip to make its shape permanent and give it the desired uniformity of cross-section throughout its entire length.

The invention consists in the several improvements which we will now proceed to describe and claim.

Figure 5:
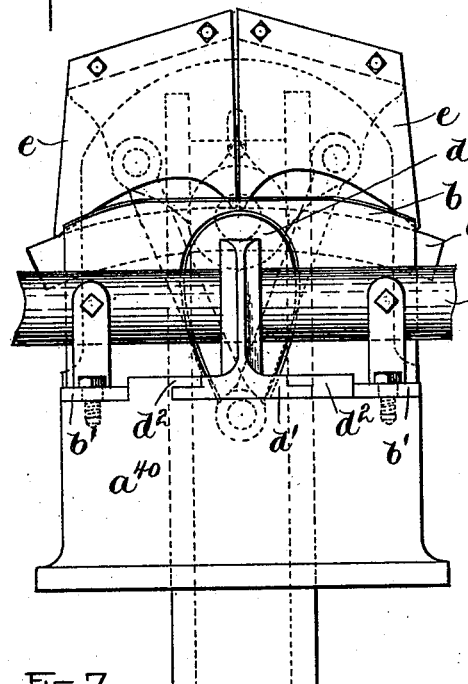
Figure 6:
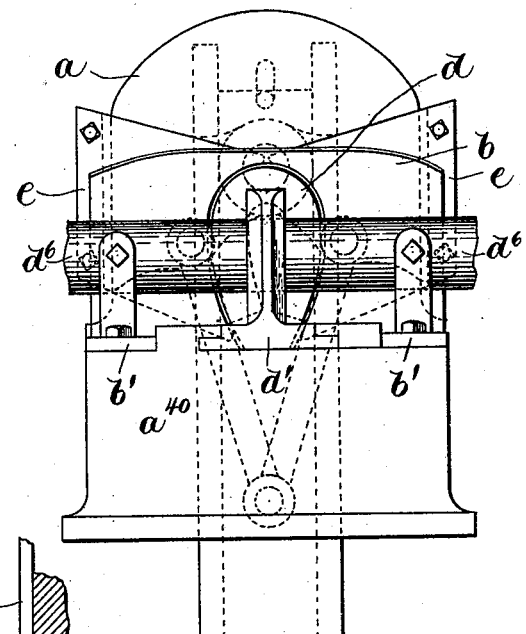
Figure 7:
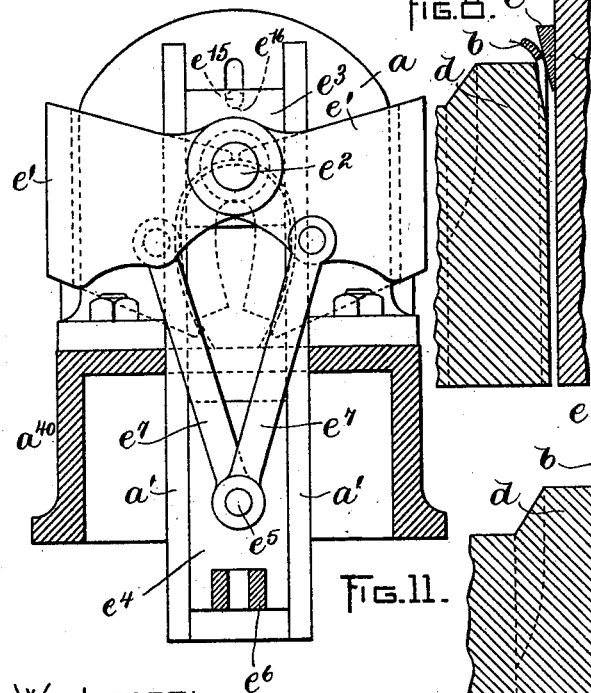

Of the accompanying drawings, forming a part of this specification, Figure 1 represents a side elevation of a rand-machine embodying our improvements. Fig. 2 represents an end elevation of the same. Fig. 3 represents a section on the line 3 3 of Fig. 1, looking toward the left. Fig. 4 represents a longitudinal section on the line 4 4 of Fig. 2. Fig. 5 represents a view similar to Fig. 2, showing the position of the followers after their preliminary movement and before their bending movement. Fig. 6 represents a view similar to Fig. 5, showing the position of the formers after their bending movement. Fig. 7 represents a view similar to Fig. 3, the formers and their carriers being in the position shown in Fig. 6. Figs. 8, 9, 10, and 11 represent views similar to portions of Fig. 4, showing the relative positions of certain parts during different stages of the operation. Fig. 12 represents a perspective view of a completed rand.

The same letters of reference indicate the same parts in all the figures.

In the drawings, $a$ represents a head, which is a stout metal plate affixed to a supporting-frame $a^{40}$ and having a flat surface at one side.

$b$ represents a metal plate which we designate a "presser-foot." Said plate is movable toward and from the head $a$ and stands substantially parallel therewith, means being employed for normally pressing the presser-foot toward the head and permitting it to yield therefrom. The presser-foot coöperates with the head $a$ in supporting a rand-blank $c$, interposed between said foot and head, while the formers, hereinafter described, are bending said blank into heel shape, the yielding pressure of the foot $b$ toward the head $a$ causing said head and foot to grasp the blank and hold it at any point to which it may be moved by the formers, so that the blank is caused to conform closely to the contour of the inner edges of the formers, as will be presently explained.

Figure 8:
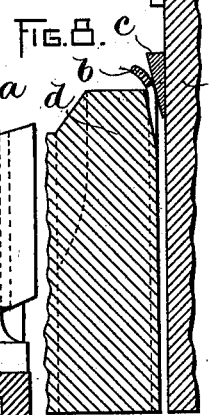
Figure 9:
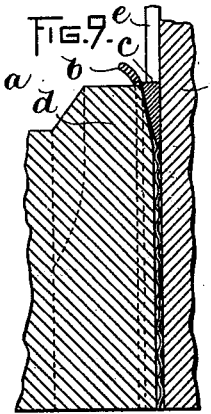
Figure 10:
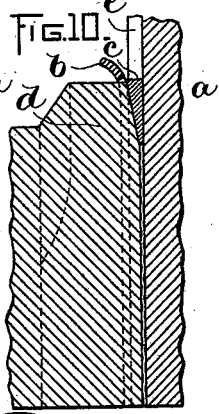
Figure 11:
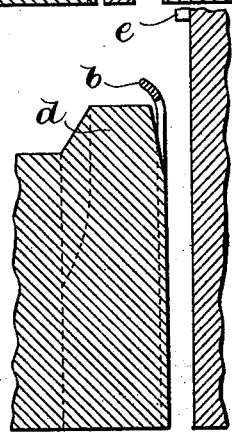
Figure 12:
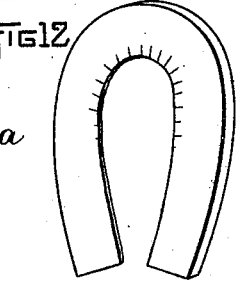

$d$ represents a heel-shaped presser or follower which is mounted upon a slide $d'$, Fig. 2, movable in guides $d^2 d^2$ on the supporting-frame $a^{40}$, and is provided with operating mechanism whereby it is moved toward and from the head $a$, said operating mechanism having provisions for holding the follower $d$ stationary at different points—first, when the follower is somewhat separated from the head $a$, as shown in Figs. 8 and 9, to afford room between the head and follower for the bending of the blank and the formation of corrugations on its inner edge, and, secondly, when the former has been moved up to the head $a$, as shown in Fig. 10, to flatten out the corrugations of the blank and complete the rand, the said mechanism being also adapted to move the former backwardly, as shown in Fig. 11, a sufficient distance to permit the completed rand to drop from between the head and the follower.

The mechanism for giving the follower the described movements as here shown comprises two levers $d^3$, mounted to oscillate on fixed studs $d^4$ at opposite sides of the machine, rods $d^5$, connecting the shorter arms of the levers $d^3$ with arms $d^6$, projecting transversely from the follower $d$, cams $d^7$, affixed to the driving-shaft and formed to first move the former from the position shown in Figs. 4 and 11 to that shown in Figs. 8 and 9 and to then move the former to the position shown in Fig. 10, and a spring $d^8$, connected with the follower and with a fixed arm on the supporting-frame, said spring retracting the follower when permitted to do so by the cam $d^7$. We do not limit ourselves, however, to these details of mechanism and may give the follower the described movements by means of any other suitable organization of mechanical elements.

The presser-foot $b$, as here shown, is mounted on slides $b'$ $b'$, said foot being a practically flat plate of metal cut away at its central portion to form an opening $b^2$, Fig. 2, which receives the follower $d$. The presser-foot is pressed normally forward by means of springs $b^3$, Fig. 1, interposed between the arms $d^6$ on the follower and the back side of the presser, and is retracted with the follower by the contact of the arms $d^6$ with adjustable screws or studs $b^4$, mounted on standards $b^5$, affixed to the slides $b'$. The springs $b^3$ press the presser-foot forward when the follower is retracted, as shown in Fig. 1, so that the presser-foot stands slightly in advance of the acting face of the follower, the foot yielding when it comes in contact with the rand-blank $c$, as indicated in Figs. 8 and 9.

$e$ $e$ represent formers, which are movable upon the flat face of the head $a$, said formers having curved inner edges which collectively correspond to the outline of the follower $d$ and are adapted to bend a rand-blank $c$ into heel form, as indicated in Fig. 6. The followers $e$ $e$ are affixed to carriers $e'$ $e'$, which are formed upon hubs or sleeves $e^{20}$, mounted, as shown in Fig. 4, upon a stud $e^2$, which is formed on a slide $e^3$. Said slide is movable between guides $a'$ $a'$, formed on the head $a$, and as it is one of two slides both movable in said guides we term it the "primary" slide to distinguish it from the other or "secondary" slide hereinafter referred to. Said primary slide has a stud or projection $e^{15}$ entering a slot or recess in the head $a$, the lower end $e^{16}$ of said slot constituting a stop which limits the downward movement of the primary slide, as shown in Fig. 7.

$e^4$ represents the secondary slide above mentioned, which is located below the primary slide and moved between the guides $a'$ and is provided with a stud $e^5$, to which are pivotally connected two links or connecting-rods $e^7$ $e^7$, the upper ends of which are pivotally connected to the former-carriers $e'$ $e'$. (See Figs. 3 and 7.) The secondary slide $e^4$ is reciprocated in the guides $a'$ by mechanism hereinafter described, and during the first part of its downward movement from the position shown in Fig. 4 it imparts a like movement to the primary slide $e^3$ through the links $e^7$, this movement of the slide $e^3$ continuing until the projection $e^{15}$ strikes the stop $e^{16}$, when the movement of the primary slide is arrested, this movement of the primary slide depressing the former-carriers without swinging them on their pivots, thus carrying the formers from the position shown in Fig. 2 to that shown in Fig. 5 and causing the formers to bear upon the central portion of a blank $c$ that has been previously inserted between the upper portion of the presser-foot and the head $a$, as shown in Fig. 8, and force said central portion downwardly to the position shown in Fig. 9. The downward movement of the secondary slide, however, continues and is caused through the links $e^7$ $e^7$ to swing the former-carriers and formers downwardly, as shown in Figs. 6 and 7, the formers being thus caused to bend the blank into heel form, as indicated in Fig. 6, the pressure to which the blank is subjected between the presser-foot and the head sufficiently retarding the movement of the blank to cause it to conform accurately to the shape of the edges of the formers. The mechanism here shown for reciprocating the secondary slide $e^4$ is a lever $e^8$, pivotally connected to the supporting-frame at $e^9$, a cam-plate $e^{12}$ on the driving-shaft $s$, and a weight (not shown) suspended from an arm $e^{14}$, fixed to the lever $e^8$, said lever having a trundle-roll $e^{21}$ on one of its arms arranged to bear upon the cam $e^{12}$. The other arm of the lever $e^8$ is connected by a link $e^{10}$ with an ear $e^6$, formed on the secondary slide $e^4$. The lever $e^8$ is oscillated vertically by the conjoint action of the cam and weight and imparts a vertical reciprocating motion, through the link $e^{10}$, to the secondary slide $e^4$. It is obvious, however, that any other suitable means may be employed for reciprocating said slide, and that instead of a cam acting in one direction only in conjunction with a weight or its equivalent the cam may be constructed to move the lever positively in both directions.

The operation is as follows: Assuming the follower $d$ to be at rest in the position shown in Fig. 8 a rand-blank $c$, which is tapering in cross-section, its outer edge being comparatively thick while its inner edge is very thin, is placed below the formers and between the presser-foot and the head, as indicated in Figs. 2 and 8, the blank being held in this position by frictional contact of the presser-foot and head, the presser-foot being yieldingly pressed toward the head, as already described. The secondary slide $e^4$ is then depressed and depresses the primary slide $e^3$, through the links $e^7$, until the downward movement of the primary slide is arrested by the stop $e^{16}$, this movement causing the formers to descend to the position shown in Fig. 5 without swinging downwardly, thus forcing the central portion of the blank to its proper position between the head and follower. The continued downward movement of the secondary slide causes the formers to swing downwardly, as shown in Figs. 6 and 7, and thus complete the bending of the blank into heel form. The bending operation corrugates the inner edge of the blank, the space between the head and the follower being sufficiently wide to permit the free and regular formation of the corrugations. The follower next advances, as shown in Fig. 10, against the head $a$ and flattens the corrugations, thus making the bent form of the blank permanent and finishing the rand, the acting face of the follower being beveled to give the desired bevel to the upper surface of the rand. The follower is then retracted, as shown in Fig. 11, carrying with it the presser-foot, the follower and foot being thus removed from the head sufficiently to permit the completed rand to drop through an opening in the supporting-frame.

That portion of the head *a* which coöperates with the formers and presser-foot in bending the blank into heel form may be termed a "guiding-face," its function being to guide and not to compress the blank. The portion of the head which coöperates with the follower *d* in compressing the bent blank and giving it its final shape may be termed a "pressing-bed," it being obvious that although the two portions of the head above alluded to are here shown as parts of the same surface their functions are different.

We claim—

1. In a machine of the character specified, a bending mechanism comprising a guide, a presser-foot yieldingly pressed toward the guide, and formers adapted to coöperate with the presser-foot and guide in bending and corrugating a blank, combined with a positively-acting pressing mechanism to which the bent and corrugated blank is presented by the bending mechanism.

2. In a machine of the character specified, a bending mechanism comprising a guide, a presser-foot yieldingly pressed toward the guide, and formers adapted to coöperate with the presser-foot and guide in bending and corrugating a blank, combined with a pressing-bed to which one side of the bent and corrugated blank is presented by the bending mechanism, and a follower movable toward and from said bed.

3. A rand-making machine comprising, first, bending devices which include opposing faces whereby a yielding pressure is exerted on an interposed blank, and formers movable between said faces, secondly, positively-acting pressing devices which receive the bent blank from the bending devices, and mechanism for successively operating said bending and pressing devices.

4. A rand-making machine comprising in its construction a fixed head having a guiding-face and pressing face or bed, a presser-foot normally pressed toward said guiding-face, formers movable on the head and adapted to coöperate with the presser-foot and head in bending a rand-blank into heel form and at the same time corrugating its inner edge, a heel-shaped follower movable toward and from the said pressing face or bed, and operating mechanism whereby the formers and follower are successively operated, the follower flattening the corrugations and finishing the rand after the bending operation.

5. A rand-making machine comprising in its construction a fixed head having a guiding-face and a pressing face or bed, a presser-foot normally pressed toward the head, a heel-shaped follower movable toward and from the head, formers movable on the guiding-face of the head and adapted to bend a rand-blank into heel shape, former-operating mechanism whereby the formers are moved to first insert the central part of a rand-blank between the head and the presser-foot and then bend the blank into heel form and at the same time corrugate its inner edge, the blank being under pressure from the presser-foot during the bending operation, whereby its outer edge is caused to conform closely to the shape of the formers, and follower-operating mechanism whereby the follower is held separated from the head during the bending operation, leaving room for the formation of the corrugations on the inner edge of the blank, and is then moved toward the pressing face or bed portion of the head to flatten the corrugations and finish the rand.

6. A rand-making machine comprising in its construction a fixed head having a guiding-face, a presser-foot movable toward and from the head and pressed normally toward the head, a heel-shaped follower also movable toward and from the head, connections between the follower and presser-foot whereby a backward movement of the follower is imparted to the presser-foot to separate the latter from the head, formers movable on the guiding-face of the head and adapted to bend a rand-blank into heel shape between the head and presser-foot, and operating mechanism whereby the formers and follower are operated successively to first bend and corrugate and then press and finish a rand, the follower and presser being subsequently withdrawn from the head to release the rand.

7. A rand-making machine comprising in its construction a fixed head having a guiding-face, a presser-foot normally pressed toward said face, a reciprocating primary slide having a limited movement on said head, former-carriers pivoted to said slide and provided with formers which are movable on the guiding-face of the head, a secondary slide connected by links with the primary slide, mechanism for reciprocating the secondary slide to cause first a movement of the primary slide and a rectilinear movement of the formers, and then a swinging movement of the formers after the stoppage of the movement of the primary slide, the said rectilinear movement causing the formers to insert the central portion of the blank between the head and the presser-foot, while the swinging movement causes the formers to bend the blank into heel form between the said head and presser-foot and to corrugate the inner edge of the blank, and means for pressing the bent blank to flatten said corrugations and finish the rand.

8. A rand-making machine comprising in its construction a fixed head having a guiding-face, formers movable on the head and adapted to bend a rand-blank into heel form, a heel-shaped follower movable in guides on the supporting-frame, mechanism for moving said follower toward and from the head, said mechanism having provisions for holding the follower stationary at different periods, first when separated from the head by a space sufficient to permit the free bending of the blank and the corrugation of its inner edge, and secondly when in contact with the head and while pressing and completing the rand, a presser-foot movable toward and from the head and adapted to coöperate with the formers as described during the operation of bending the blank, means for yieldingly projecting the presser-foot forward from the follower while the latter is held stationary during the bending operation, and means for moving the presser backwardly from the completed rand.

In testimony whereof we have signed our names to this specification, in the presence of two subscribing witnesses, this 6th day of June, A. D. 1895.

AMASA C. HEATH.
FRED H. WHITE.

Witnesses:
C. F. BROWN,
A. D. HARRISON.